United States Patent Office 3,034,616
Patented May 15, 1962

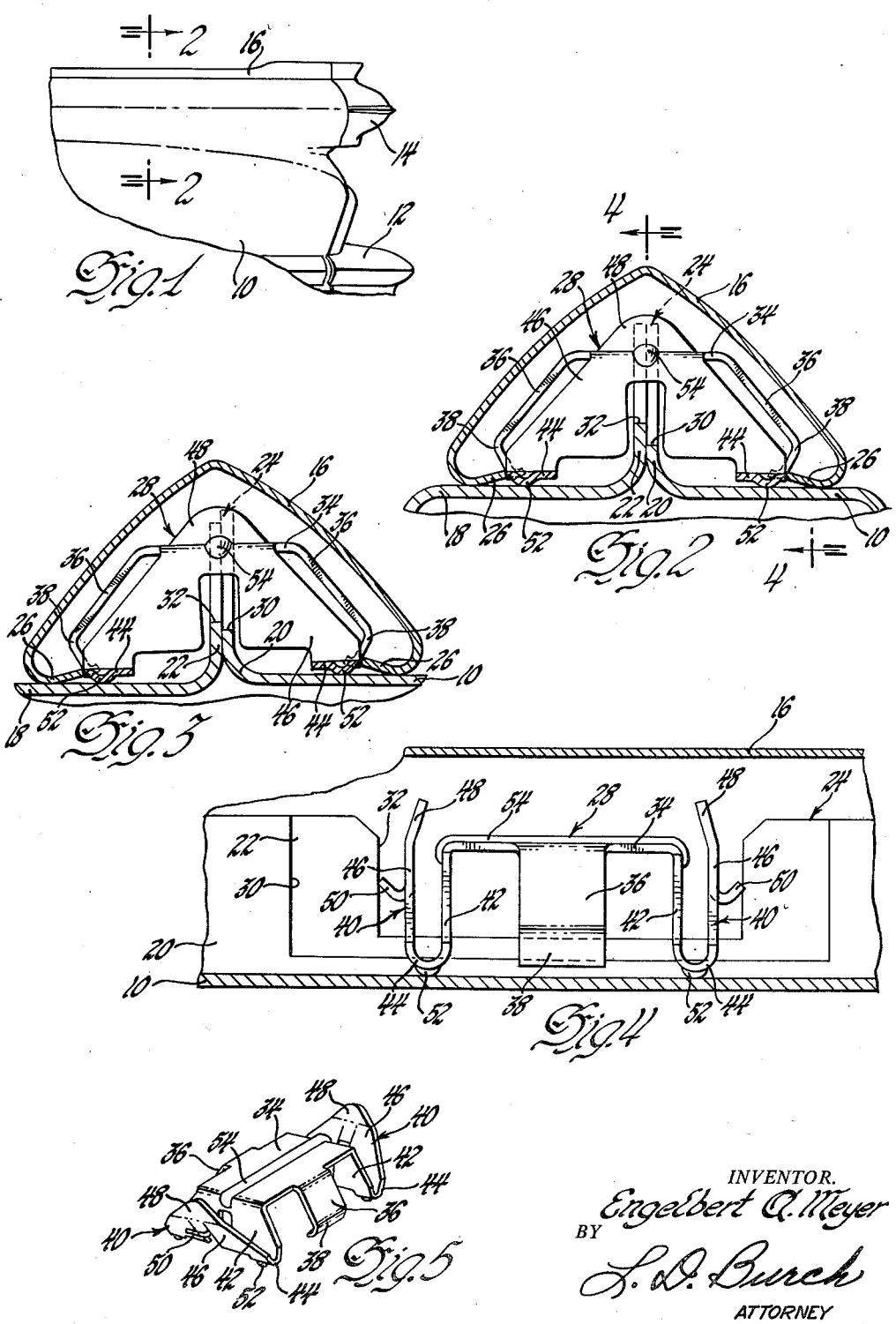

3,034,616
PINCHWELD CLIP
Engelbert A. Meyer, Detroit, Mich., assignor to General Motors Corporation, Detroit, Mich., a corporation of Delaware
Filed Oct. 6, 1959, Ser. No. 844,735
8 Claims. (Cl. 189—88)

This invention relates to fasteners and more particularly to a fastener for retaining a chrome molding strip vore a pinchweld connection between a pair of panel members.

In motor vehicle manufacture it is becoming increasingly popular to employ pinchweld flange connections between various panel members. This type of connection is formed by a flange, bent at approximately 90° with respect to the body of the panel member, and abutting a similarly formed flange in the adjoining piece. The two flanges are then spot welded, seam welded or joined in some other convenient fashion, rigidly securing the two panel members together with an upstanding double flange that must be covered in order to enhance the aesthetic appeal of the vehicle. Such a pinchweld flange connection may generally be found between a rear quarter panel of a motor vehicle where it is connected along the top to the upper quarter panel extension, extending between the trunk lid and the peak of the quarter panel.

The general method of covering the pinchweld flange in motor vehicle manufacture is to use a chrome molding strip of substantially U-shaped cross section, the molding strip extending along the length of the pinchweld flange. This requires some means for retaining the molding strip over the flange in a manner preventing vibrations, bumps and the like from jarring the chrome strip loose. Fastener devices utilized in the past have been designed accodring to the design of the parts to be secured and usually comprise a large number of tabs and tongues formed at many different angles with respect to the body of the clip. These present numerous installation problems, such as the twisting of various tabs on installation which flatten out the chrome strip and present an unseembly appearance. It is usually found that the greater the number of tabs, tongues and so forth, that are provided on a particular fastener greatly increases the amount of assembly time and greatly complicates the assembly operation.

A further disadvantage that may be found in generally known pinchweld fasteners results from a slight amount of misalignment between the panels to be joined, due to manufacturing tolerances and the like. With the well known types of pinchweld fasteners, the installation of the fastener and the chrome strip generally results in a deformed structure presenting again an unsightly appearance.

The device in which this invention is embodied comprises generally, a fastener having legs and tongues extending only from the four sides of the body of the clip and being easily secured in an opening formed in the pinchweld flange. The legs are so formed that the installation of the fastener in the pinchweld flange is extremely simple, requires no special tools, and it is extremely difficult to deform or insert the fastener in an improper position. With the fastener in place, it is necessary only to snap the chrome strip over the tongues of the fastener to securely retain the chrome strip over the pinchweld flange. A plurality of nubs or depressions are formed in the fastener to present only a small amount of area in actual contact with the panel members, in order to compensate for misalignment of the various panels and keep the appearance of the chrome strip satisfactory even though the panels may be misaligned.

The fastener structure provides a more positive means of retention than heretofore available, as well as ease in installation and the economic advantages resulting therefrom.

These and other advantages will become more apparent from the following descriptions and drawings in which:

FIGURE 1 illustrates a portion of a motor vehicle showing a chrome strip mounted over a pinchweld flange.

FIGURE 2 is an enlarged portion of the motor vehicle illustrated in FIGURE 1 with parts broken away and in section to show the fastener and the means for securing the chrome strip.

FIGURE 3 is a view similar to that of FIGURE 2 with parts broken away and in section to illustrate a misaligned connection between the panel members.

FIGURE 4 is an elevational view of the fastener illustrated in FIGURE 2 taken substantially along the line 4—4 of FIGURE 2 and looking in the direction of the arrows.

FIGURE 5 is a perspective view of the fastener structure illustrated in FIGURES 2 through 4.

Referring more particularly to the drawings, a typical motor vehicle section is illustrated in FIGURE 1. The drawing shows a vehicle rear quarter panel 10, serving as one side of a rear fender, and having a bumper 12 and a tail light 14 mounted thereon. A chrome strip 16 covers the pinchweld flange connection between the rear quarter panel 10 and the upper quarter panel extension (not shown), extending between the peak of the quarter panel 10 and the trunk lid (not shown).

Referring to FIGURE 2, the quarter panel 10 and the quarter panel upper extension 18 are shown to have flanges 20 and 22 respectively, bent at approximately 90° with respect to the bodies thereof, to form the pinchweld flange illustrated by the numeral 24. The two flanges 20 and 22 may be spot-welded, or the like, as previously described.

The molding strip 16, of generally U-shaped cross section and having flanges 26 extending inwardly at the top of the legs of the U, is retained over the pinchweld flange by a fastener, illustrated generally by the numeral 28. An opening or slot 30 is formed in the flange of the quarter panel 10 and a similar opening or slot 32 is formed in the flange 22 of the quarter panel extension 18. These slots may be of the same size and configuration, or may be of different sizes and configurations as illustrated in the drawings. The advantages realized in the different sizes and configurations lies in the fact that manufacturing tolerances need not be maintained in order to exactly position the two parts so that the slots are aligned on assembly. The fastener 28 is received in the opening formed by the slots to present as low an outline as possible, permitting a conveniently small molding strip.

The fastener may best be illustrated with reference to FIGURE 4. A fastener body 34 of generally rectangular shape is disposed in spaced relation within the opening provided by the slots 30 and 32. A tongue 36 extends from each side of the body 34, in downward and outward directions toward the flanges 26 of the molding strip 16. Each tongue terminates in a lip 38 which is turned inwardly with respect to the tongue 36, the edge of the lip 38 engaging the innermost edge of the molding strip flange 26 on either side. This permits secure retention of the molding strip 16 over the pinchweld flange 24.

Extending from each end of the body 34 is a substantially U-shaped leg, generally illustrated by the numeral 40. The inner portion 42 of the U-shaped leg extends vertically downwardly toward the panel member, is reversely bent to form the base of the U 44, adjacent the panel member, and the outer portion of the U 46 extends upwardly from the panel member. In the free position, illustrated in FIGURE 5, the outward portion 46 of the leg 40 extends at an angle with respect to the inward portion 42 of the leg 40. Upon insertion of the fastener into the opening formed by the slots 30 and 32 in the pinchweld flange, the outward portion 46 of the leg 40 is sprung inwardly and, when released, secures the fastener in the opening. The upper ends 48 of the outward portions 46 are inwardly bent with respect to the portion 46, in order to provide a grip for the operator installing the fastener in the pinchweld flange.

A rib 54, extending lengthwise of the body 34 may be used to strengthen the fastener, although such a construction is not necessary.

In order to retain the fastener securely within the opening defined by the slot 32 in the quarter panel extension 18, as illustrated in the drawings, or to retain the fastener in engagement with both edges of the slots if the two were of the same size and configuration, a tab 50 is struck from the outward portion 46 of each leg 40 and so formed as to bite into the edge of the flange and prevent movement of the fastener in an upward direction, as viewed in the drawings. It may be seen that outer portions 46 of legs 40 are biased in an outward direction so that any attempt to move the fastener upwardly would only increase the bite taken by the edge of the tab 50 in the flange formed in the panel member. Thus, the fastener is securely retained in the pinchweld flange.

In order to space the fastener from the panel members 10 and 18 and to compensate for any misalignment therebetween, a plurality of nubs 52 are formed in the base 44 of the U-shaped legs 40. Four-point contact is maintained between the fastener and the panel members, permitting a slight amount of angulation of the fastener, as illustrated in FIGURE 3, and maintaining a secure contact between the tabs 50 and the edge of the flange 22. The chrome strip 16 is still retained in its proper position by the resilient tongues 36 and the lips 38, preventing an unsightly appearance of the vehicle trim.

The installation of the fastener illustrated in FIGURES 2 through 5 is as follows: The fastener is picked up by the operator by the inwardly bent extension 48 of the legs 40, the two outward portions 46 of the legs being forced toward each other by the operator and placed in the opening defined by the slot 32. The fastener is bottomed on the panel members 10 and 18, and the upper extensions 48 are released, to allow the outer portions 46 of the legs 40 to spring outwardly, causing the tabs 50 to bite into the flange 22 in the edges of the opening 32. The fastener is thus secured in the pinchweld flange. When the chrome strip is to be mounted over the pinchweld flange it is merely placed so that the flanges 26 overlie the tongues 36, and then snapped into place so that the flanges 26 ride over the tongues 36 and over the lips 38. With the chrome strip 16 installed, the upper corner of the edge of the flange 26 abuts the lip 38 and is prevented from upward movement by the inclined surface of the lip 38. The lower corner of the edge of the flange 26 is limited in its inward movement by the base 44 of the U-shaped leg 40. Thus, the chrome strip is secured by the fastener and retained properly over the pinchweld flange.

It may be seen that a fastener structure is provided for rigidly securing a chrome strip over a pinchweld flange with a minimum of effort and maximum positive securement. There are no tabs or tongues associated with the fastener that can be deformed or bent out of shape by the operator installing the fasteners, thus preserving the aesthetic value of the chrome strip over the pinchweld flange.

What is claimed:

1. A fastener receivable in an opening formed in a pinchweld flange and retaining a molding strip of substantially U-shaped cross section over said flange and comprising a body, a generally U-shaped resilient leg extending from each end of said body and engaging said pinchweld flange for retaining said fastener therein, and a tongue extending from each side of said body and adapted to engage the innermost edges of said molding strip for rigidly securing said molding strip to said flange.

2. A spring metal fastener receivable in an opening formed in a pinchweld flange and retaining a molding strip of substantially U-shaped cross section over said flange and comprising a body, a generally U-shaped resilient leg extending from each end of said body and engaging said pinchweld flange for retaining said fastener therein, and a tongue extending from each side of said body and adapted to engage the innermost edges of said molding strip for rigidly securing said molding strip to said flange.

3. A fastener for securing a molding strip of substantially U-shaped cross section over a pinchweld flange connection between two panel members and comprising a body receivable in an opening formed in said pinchweld flange, a tongue extending from each side of said body and adapted to engage the inturned edges of said molding strip, a generally U-shaped leg extending from each end of said body adapted to engage the edges of the opening in said pinchweld flange for securing said fastener and said molding strip therein, and means spacing said body and said tongues and said legs from said panels for permitting securement of said fastener and said molding strip in said pinchweld flange under conditions of misalignment of said panels forming said pinchweld flange.

4. A spring metal fastener for securing a molding strip of substantially U-shaped cross section over a pinchweld flange connection between two panel members and comprising a body receivable in an opening formed in said pinchweld flange, a tongue extending from each side of said body and adapted to engage the inturned edges of said molding strip, a generally U-shaped leg extending from each end of said body adapted to engage the edges of the opening in said pinchweld flange for securing said fastener and said molding strip therein, and means spacing said body and said tongues and said legs from said panels for permitting securement of said fastener and said molding strip in said pinchweld flange under conditions of misalignment of said panels forming said pinchweld flange.

5. A fastener for securing a molding of substantially U-shaped cross section over a pinchweld flange connection between two panel members and comprising a body disposed in an opening in said pinchweld flange, a tongue extending from each side of said body, a lip formed at the outer end of each of said tongues for engaging the inturned edges of said molding strip, a U-shaped leg extending from each end of said body and having the outward portion thereof resiliently biased toward the edge of the opening in said pinchweld flange, a tab struck outwardly from said outer portion of said leg for engaging the edge of the opening in said pinchweld flange and securing said fastener therein, and a pair of nubs struck downwardly from the base of said U-shaped leg for engaging said panels and spacing said fastener therefrom and compensating for misalignment of said panels connected by said pinchweld flange.

6. The fastener set forth in claim 5 and further having a strengthening rib formed along the length of said body.

7. A fastener for securing a molding strip of substantially U-shaped cross section over a pinchweld flange connection between two panel members and comprising a body disposed in an opening in said pinchweld flange, a tongue extending outwardly and downwardly from each side of said body, said tongue terminating in an inturned lip for engaging the innermost edges of said molding strip, a substantially U-shaped leg extending from each end of said body and having the base portion thereof disposed adjacent said panel members, a tab struck outwardly from the outer portion of said leg and engaging the edge of the opening in said pinchweld flange to prevent movement of said fastener in a direction away from said panels, and a pair of nubs struck from the base portion of said leg, one of said nubs engaging one of said panels and the other of said nubs engaging the other of said panels, said nubs spacing said fastener from said panels and compensating for conditions of misalignment therebetween.

8. The fastener set forth in claim 7 and further having a rib formed out of the plane of said body and extending along the length thereof for strengthening said body.

References Cited in the file of this patent

UNITED STATES PATENTS 2,963,133   MacCallum _____ Dec. 6, 1960

OTHER REFERENCES

Automotive Jobbers Catalog: No. 49 J—Dot Fasteners, published by United-Carr Fastener Corp., Cambridge 42, Mass., copyright 1949 (page 11 of interest).